United States Patent
Bhavanam et al.

(10) Patent No.: US 8,000,265 B2
(45) Date of Patent: Aug. 16, 2011

(54) METHOD AND SYSTEM FOR DETERMINING NETWORK TOPOLOGY OF A VIRTUAL PRIVATE NETWORK IN MULTI PROTOCOL LABEL SWITCHING (MPLS) BASED VIRTUAL PRIVATE NETWORKS (VPNS)

(75) Inventors: Kotilingareddy Bhavanam, Karnataka (IN); Muthukumar Suriyanarayanan, Karnataka (IN); Swamy Jagannadha Mandavilli, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 12/483,268

(22) Filed: Jun. 12, 2009

(65) Prior Publication Data

US 2010/0278073 A1 Nov. 4, 2010

(30) Foreign Application Priority Data

Apr. 29, 2009 (IN) .............................. 986/CHE/2009

(51) Int. Cl.
*H04L 12/28* (2006.01)

(52) U.S. Cl. ..................... 370/254; 370/395.53; 709/242
(58) Field of Classification Search .................. None
See application file for complete search history.

(56) References Cited

U.S. PATENT DOCUMENTS

| | | | |
|---|---|---|---|
| 7,400,611 B2 | 7/2008 | Mukherjee et al. | |
| 7,593,352 B2 * | 9/2009 | Verma .......................... | 370/255 |
| 7,643,434 B2 | 1/2010 | Mandavilli et al. | |
| 2006/0215578 A1 * | 9/2006 | Andrapalliyal et al. ...... | 370/254 |
| 2007/0280241 A1 | 12/2007 | Verma | |
| 2010/0008253 A1 * | 1/2010 | Mellachervu et al. ........ | 370/254 |

\* cited by examiner

*Primary Examiner* — Chirag Shah
*Assistant Examiner* — Minh-Trang Nguyen

(57) ABSTRACT

Presented is a method and system of determining network topology of a virtual private network in Multi Protocol Label Switching (MPLS) based Virtual Private Networks (MPLS/VPNs). The method includes obtaining VPN routing and forwarding (VRF) details of at least one virtual private network, determining any variations in network configuration and determining, from said network configuration variations, network topology of the at least one virtual private network.

15 Claims, 7 Drawing Sheets

FIG. 2     200

METHOD AND SYSTEM FOR DETERMINING NETWORK TOPOLOGY OF A VIRTUAL PRIVATE NETWORK IN MULTI PROTOCOL LABEL SWITCHING (MPLS) BASED VIRTUAL PRIVATE NETWORKS (VPNS)

RELATED APPLICATIONS

Benefit is claimed under 35 U.S.C. 119(a)-(d) to Foreign application Serial No. 986/CHE/2009 entitled "METHOD AND SYSTEM FOR DETERMINING NETWORK TOPOLOGY OF A VIRTUAL PRIVATE NETWORK IN MULTI PROTOCOL LABEL SWITCHING (MPLS) BASED VIRTUAL PRIVATE NETWORKS (VPNs)" by Hewlett-Packard Development Company, L.P., filed on 29 Apr. 2009, which is herein incorporated in its entirety by reference for all purposes.

BACKGROUND

A virtual private network (VPN) can be defined as a network that uses a public telecom infrastructure to provide remote offices or individual users with secure access to their organization's network. A VPN works by using a shared infrastructure while maintaining privacy through various security and confidentiality procedures.

Till recently, most of the VPN infrastructures were built using Frame-Relay or ATM networks connecting customer sites via virtual circuits (VCs). However, with a tremendous increase in customer requirements (such as video conferencing) and the eventual complexity of developing networks, a need for a more scalable approach was felt. MPLS VPN technology is proving to quite useful in this regard. MPLS VPN is a set of processes that use the power of Multi Protocol Label Switching (MPLS) to create virtual private networks (VPNs). MPLS is designed to meet the characteristics of a large-scale carrier network and integrates the best of layer 2 and layer 3 technologies. A layer 3 MPLS VPN, also known as L3VPN, combines BGP signaling, MPLS traffic engineering and router support for VRFs (Virtual Routing/Forwarding) to create an IP based VPN. Compared to other types of VPN, MPLS L3VPN provides a connection-oriented approach towards customer routing. It also provides a more cost efficient way to manage applications between different locations and can provide more services.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
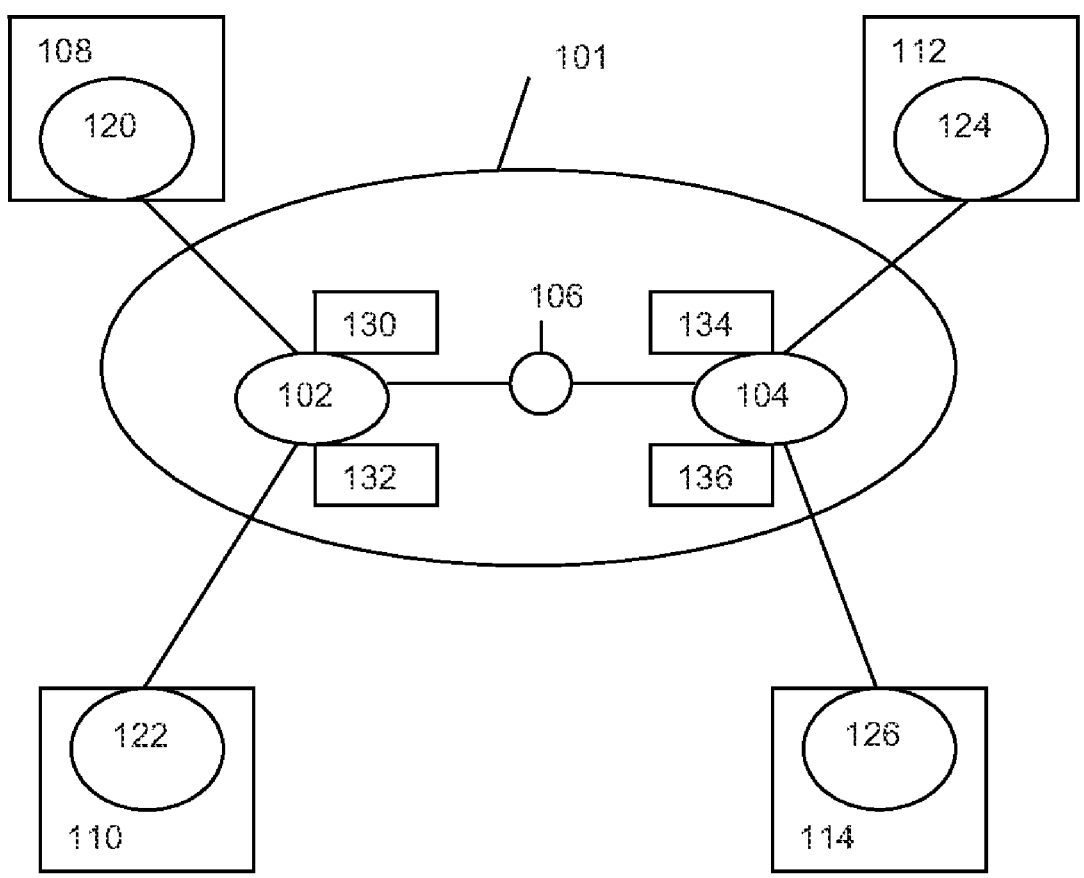
FIG. 1 shows a block diagram of a Multi Protocol Label Switching (MPLS) based Virtual Private Network (VPN) according to an embodiment.

For clarity and convenience, the following definitions are used herein:

The term "network topology" refers to both physical and logical topology of network nodes.

The term "VPN routing and forwarding (VRF) details" include information, such as, but not limited to, an IP routing table, a forwarding table, a list of devices that may be called upon to forward data packet, and a set of rules and routing protocols that determine how the data packets are forwarded.

Multi Protocol Label Switching (MPLS) provides an effective method for supporting VPNs. It is a standards-approved technology for speeding up network traffic flow. The usefulness of MPLS originates from the fact that it can work with many other networking technologies such as IP, Frame-Relay and ATM. MPLS uses layer 3 routing protocols along with layer 2 transport mechanisms. In the context of VPNs, the MPLS/VPN combination provides the capability to form an IP network infrastructure that delivers private network services (for a customer) over a public infrastructure (such as Internet).

An MPLS-based virtual private network (MPLS/VPN) consists of routers and switches interconnected with each other via various transport means. There are two kinds of MPLS-based VPN: Layer 2 VPNs (example are VPLS, VPWS) and Layer 3 VPNs. In Layer 3 VPNs, the service provider edge (PE) router participates in a customer's Layer 3 routing.

In a service provider scenario, customers of the service provider connect to the backbone of the MPLS network through provider edge (PE) routers. The backbone is made up of core routers that provide connectivity between the PE routers. IP routing protocols are used to exchange routing information and calculate forwarding paths between routers. Examples of IP routing protocols include Open Shortest Path First (OSPF) and Border Gateway Protocol (BGP). MPLS signaling protocols are used to establish and maintain label-switched paths. Examples of MPLS signaling protocols include BGP and Label Distribution Protocol (LDP).

A key component within a MPLS network is the label switching router (LSR), which is capable of routing data packets. The label switched paths (LSPs) define the flow of packets between two endpoints. A Customer Edge (CE) router at a customer site connects to the MPLS network at one or more Provider Edge (PE) routers. MPLS performs traffic separation at Layer 3 using VPN Routing and Forwarding (VRF) instances. VPN routing and forwarding (VRF) technology enables the creation of a single virtual system containing components spread across multiple locations. They divide a router into multiple independent virtual devices and enables PE routers to appear to be many routers to the customer edge (CE) routers. The provider edge (PE) router maintains separate and distinct routing tables for each customer. It is for the PE to determine which forwarding table to use when handling a data packet from a particular customer or CE. The PE routers also assign a label with each VPN customer route a share these labels with other PEs, assuring that data packets are directed to the correct CE.

A VRF has two main components: the route distinguisher (RD) and the route target (RT). A route distinguisher is a number that helps identify a VPN address in a provider's network. The route target is a number which is tagged with every VPN route when it is exported from a VRF. The route target is basically used to indicate the VPN membership. Providing a unique VRF to each customer's VPN allows a logical separation of L3 functions for customers which share common network devices. The separation allows service providers to separate multiple customers on their backbone.

One can use VRF route targets to configure a variety of VPN topologies, such as full-mesh VPNs, hub-and-spoke VPNs, and overlapping VPNs. In a full-mesh VPN, each site in the VPN can communicate with every other site in the same VPN. In a hub-and-spoke VPN, the spoke sites in the VPN can communicate only with the hub sites. In an overlapping VPN, a site is a member of more than one VPN.

MPLS uses the concept of a forward equivalency class (FEC) to designate a group of IP packets to which a specific label is bound. Labels are assigned to each packet in FEC. An MPLS router makes a forwarding decision for an incoming packet by looking at its label. It then consults the forwarding table to identify the interface to forward the labeled packet out. Prior to delivery of packets a path through the network is defined in the FEC. This is called as the labeled switch path (LSP). An LSP is a virtual path across which traffic is forwarded from one end of the network to the other. It is the essence of MPLS technology that traffic is grouped into FECs.

Virtual Private Networks (VPNs), like other networks, are dynamic due to faults, changes in configuration for existing services and provisioning of additional services. Therefore, it is desirable that as and when network physical topology changes, the logical topology computed by a Network Management System (NMS) should reflect the same for accurate presentation, status computation and fault analysis. Current techniques however take the view of entire network and do not solve incremental configuration changes for the network. This poses a scalability problem if re-computation is attempted for the entire network whenever there is a small change. It is desirable to compute incremental configuration changes in only those VPNs which are affected in a MPLS-based VPN.

FIG. 1 shows a block diagram of a Multi Protocol Label Switching (MPLS) based Virtual Private Network (VPN) (100) for implementing the present invention according to an embodiment. The network comprises a service provider (SP) network (101) and customer sites (108, 110, 112 and 114). The service provider (SP) network (101) comprises a core router (106) and Provider Edge (PE) routers (102 and 104). The customer sites (108, 110, 112 and 114) are connected to the Provider Edge (PE) routers (102 and 104) through Customer Edge (CE) routers (120, 122, 124 and 126). The core router (106) is connected to the Provider Edge (PE) routers (102 and 104).

A service provider (SP) network (101) may be any organization or an enterprise that offers VPN or other IP routing services. The customer sites may be other networks, such as, but not limited to, VPNs, extranets and intranets. Further, the customer sites may be located at diverse geographical locations. To provide an illustration, by way of example, the customer sites may be located at Paris, Singapore, Tokyo, Palo Alto etc.

IP routing protocols such as, but not limited to, Open Shortest Path First (OSPF) and Border Gateway Protocol (BGP) may be used for exchange of routing information between PE (102 and 104) and CE routers (120, 122, 124 and 126). The CE router is a routing peer of the PE to which it is directly connected but is not a routing peer of CE routers at other site. The CE router (120, 122, 124 and 126) advertise the identity of local VPN routes to the PE routers (102 and 104) and learns remote VPN routes from the PE routers (102 and 104). This ensures route separation between the VPNs. Each PE router (102 and 104) has a per-site Virtual Routing and Forwarding (VRF) table that contains only the set of routes available to that CE router (120, 122, 124 and 126). The PE routers (102 and 104) uses MP-BGP (Multi protocol Border gateway Protocol) to exchange the customer routes in service provider network based on VRF configuration on PE router. In FIG. 1, PE router (102) has two VRF tables (130 and 132) containing VPN routing and forwarding information for CE routers (120 and 122) respectively. Each PE router contains VRF tables for only those CE routers to which it is directly connected. PE routers exchange routing information with other PE routers.

Figure 2:
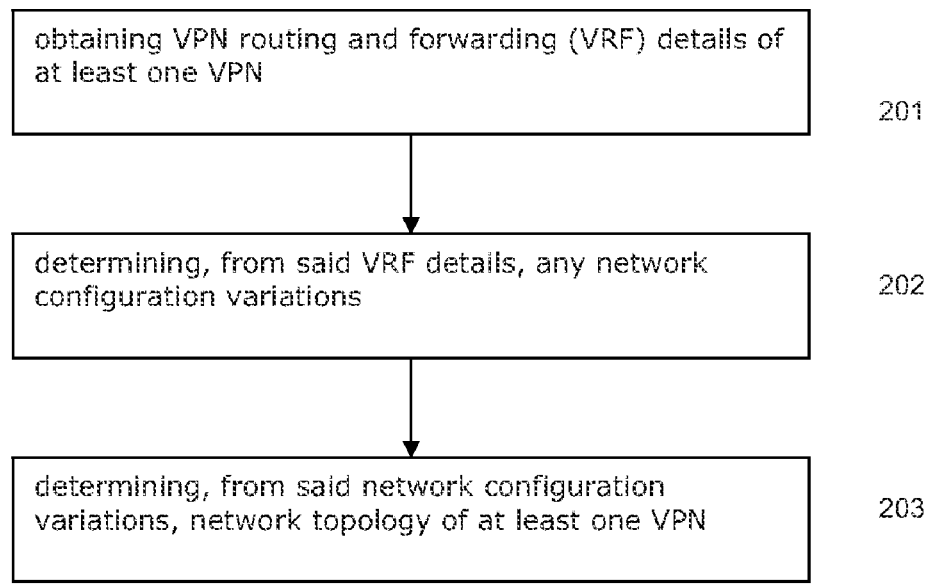
FIG. 2 shows a flow chart of a method 200 for determining network topology of a virtual private network in Multi Protocol Label Switching (MPLS) based Virtual Private Networks (MPLS/VPNs) according to an embodiment.

FIG. 2 shows a flow chart of a method 200 for determining network topology of a virtual private network in Multi Protocol Label Switching (MPLS) based Virtual Private Networks (VPNs) according to an embodiment. The method 200 may be performed in a computer system or any electronic device. Further, a Network Management System (NMS), such as, but not limited to, NNMi SPI for MPLS 8.10 from Hewlett-Packard, may be used on a computer system to manage the VPN implementation of FIG. 1 and to implement the below described methods.

In step 201, the method obtains VPN routing and forwarding (VRF) details from Provider Edges routers for at least one virtual private network (VPN) in a plurality of MPLS-based virtual private networks (VPNs). In an embodiment, an SNMP (Simple Network Management Protocol) based agent may contact at least one VPN PE router to obtains VPN routing and forwarding (VRF) details. SNMP is a component of the Internet Protocol Suite and used in network management systems (NMS) to monitor and manage network devices. In step 202, the method checks whether this VRF details are collected for the first time and NMS doesn't have this VRF detail ever before, in which case, the VRF details are stored in the NMS. In case the same VRF details were already collected before, any network configuration changes or variations that may have occurred in at least one virtual private network with respect to previously available (VRF) details for the said VPN on the NMS. In step 203, the method determines, from said network configuration changes or variations, network topology of the at least one virtual private network. In an embodiment, in step 203 based on previously obtained VRF details, it is determined whether there is/are a newly created VRF(s), a modified VRF(s) or a deleted VRF(s) in the VRF details thus obtained.

Figure 3:
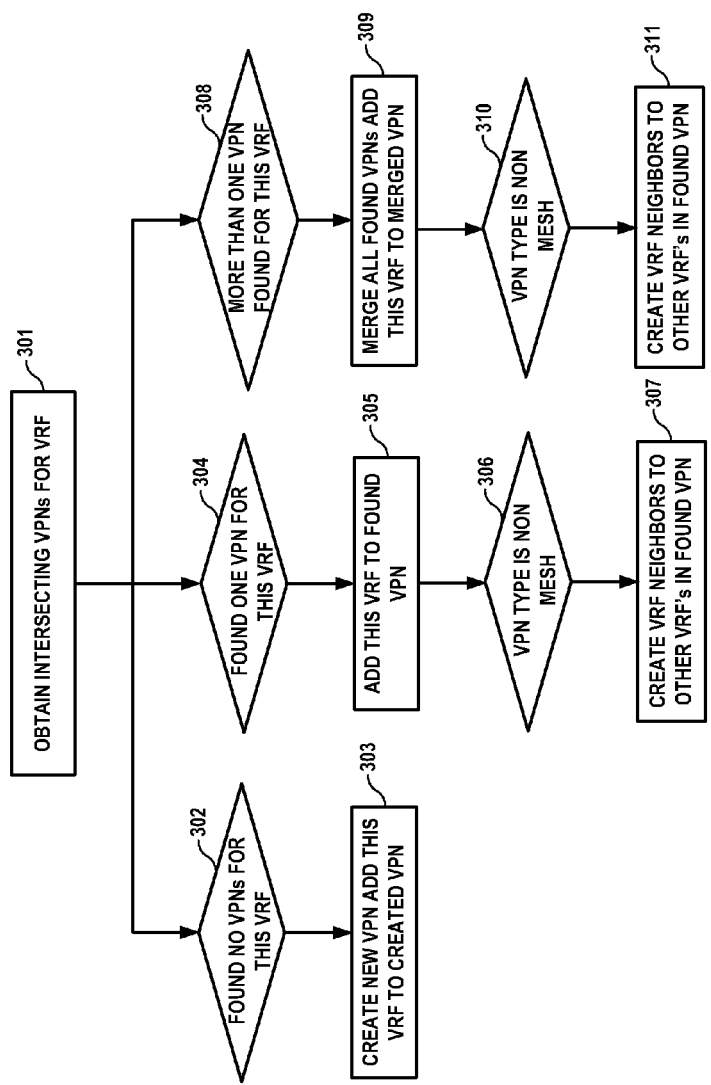
FIG. 3 shows a flow chart of further steps of the method depicted in FIG. 1 when VPN topology is computed for newly created VRFs according to an embodiment.

FIG. 3 shows a flow chart of further steps of the method depicted in FIG. 1 when VPN topology is computed for newly created VRFs according to an embodiment.

In step 301, obtain intersecting VPNs for a newly created VRF from already discovered virtual private networks (VPNs). In step 302, if no VPNs are found, a new VPN is created and the newly created VRF is assigned to the new VPN (step 303). In step 304, if a single VPN is found, it means this VRF belongs to already discovered VPN. The newly created VRF is added to the already existed VPN (step 305). In step 306, the VPN type is analysed and if the VPN is a non-full-mesh type, VRF neighbours are created to other VRFs in the determined VPN (step 307). In step 308, if newly created VRF intersecting more than one virtual private networks from previously discovered VPNs, all VPNs are merged and the newly created VRF is added to the merged VPN (step 309). In step 310, the VPN type is analysed and if the merged VPN is a non-full-mesh type, VRF neighbours are created to other VRFs in the merged VPN (step 311).

The method does not require creation of any VRF neighbour relations to other VRFs in full mesh VPN. The full mesh VPN by it self means that this VPN has full mesh of VRF to VRF neighbour relations.

Figure 4:
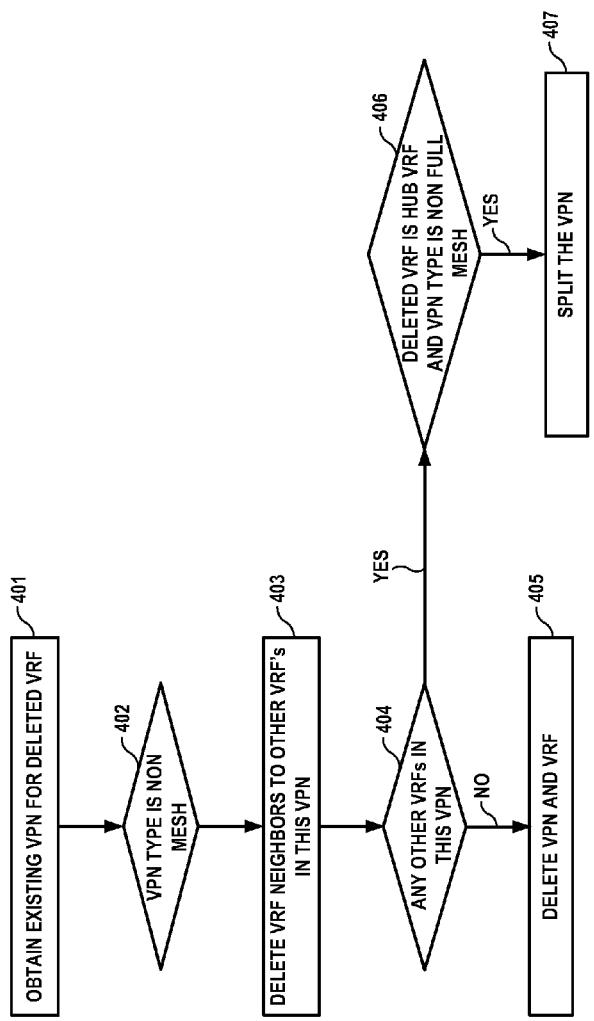
FIG. 4 shows a flow chart of further steps of the method depicted in FIG. 1 when VPN topology is computed for deleted VRFs according to an embodiment.

FIG. 4 shows a flow chart of further steps of the method depicted in FIG. 1 when VPN topology is computed for deleted VRFs according to an embodiment.

In step 401, an existing VPN for a deleted VRF is obtained. In step 402, a determination is made whether the existing VPN is a non-full-mesh type. If the existing VPN is a non-full-mesh type, VRF neighbors to other VRFs in the existing VPN are removed in step 403. In step 404, it is determined whether there are any other VRFs in the existing VPN. If there are no any other VRFs in the existing VPN, the VPN and the VRF are deleted in step 405. However, if there are any other VRFs in the existing VPN, another determination is made whether the deleted VRF is a hub VRF and the VPN is a non full mesh type (step 406). If the deleted VRF is a hub VRF and the VPN is a non full mesh type, the existing VPN is split into different VPNs, in step 407.

Figure 5A:
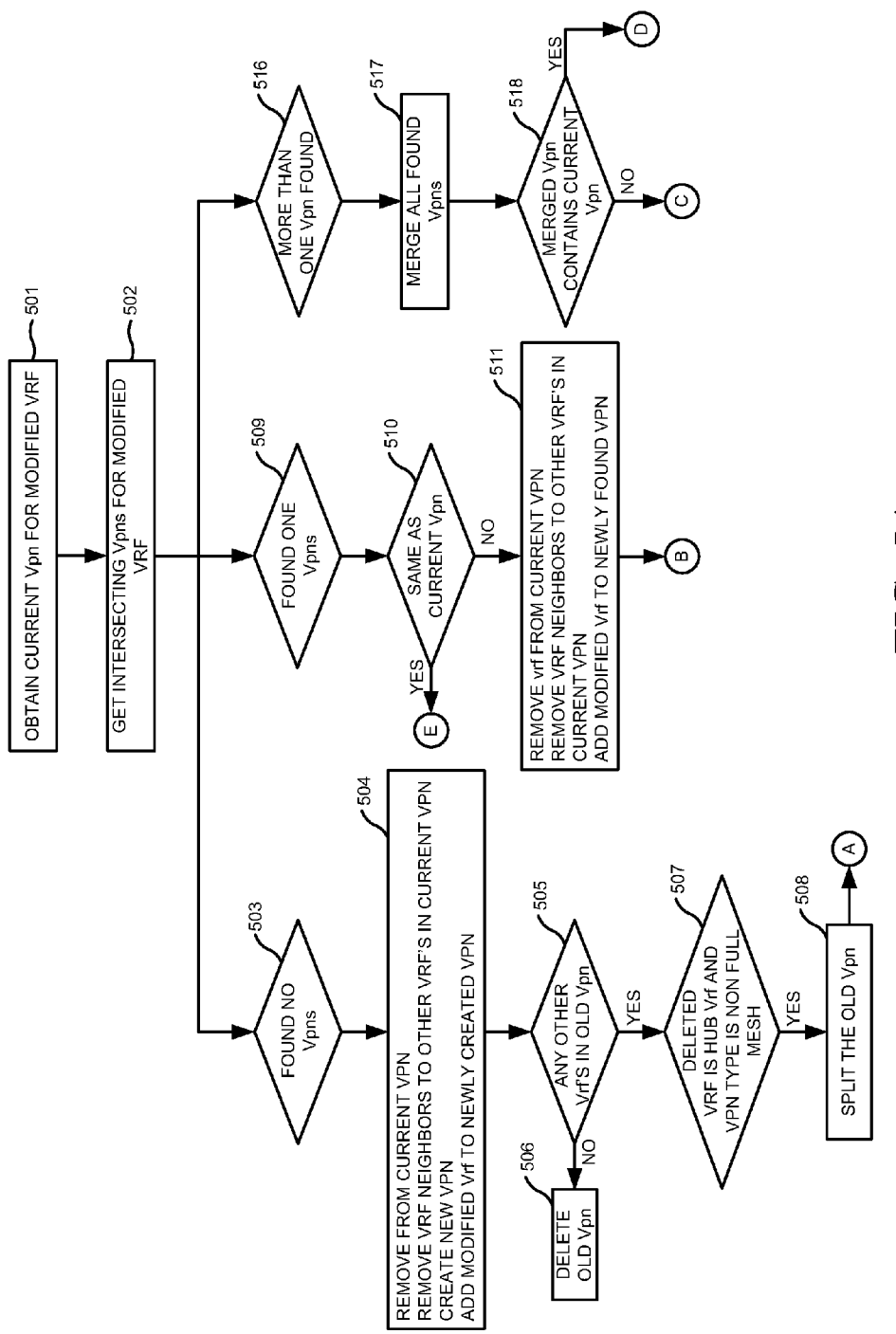
FIGS. 5A and 5B shows a flow chart of further steps of the method depicted in FIG. 1 when VPN topology is computed for modified VRFs according to an embodiment.
Figure 5B:
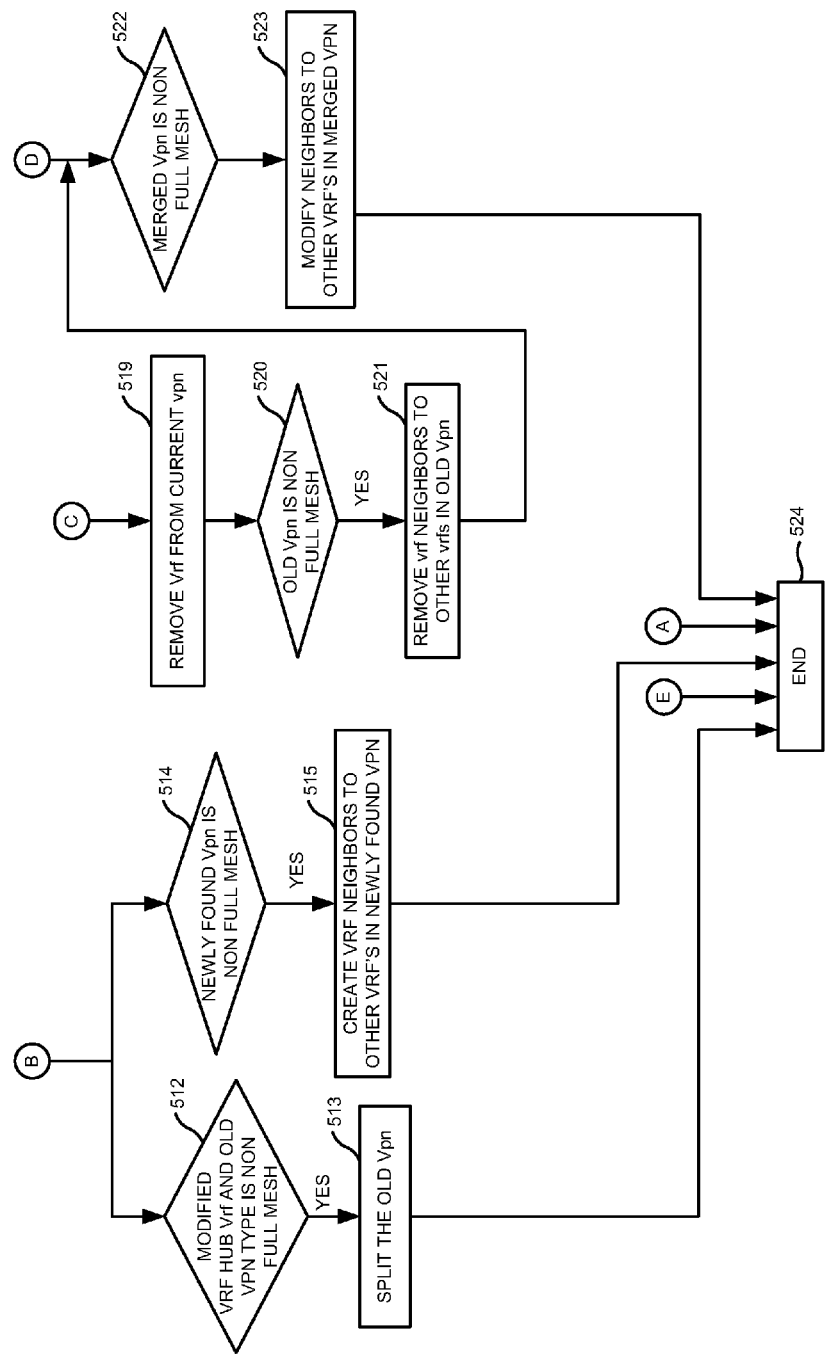

FIG. 5A shows a flow chart of further steps of the method depicted in FIG. 1 when VPN topology is computed in case there are modified VRFs according to an embodiment. FIG. 5B is a continuation of the flowchart of FIG. 5A according to an embodiment.

In step 501, an existing VPN for a modified VRF is obtained. In step 502, intersecting VPNs for the modifed VRF are obtained from previously discovered virtual private networks.

If no VPNs are found (step 503), VRF neighbours to other VRFs in the previous VPN are removed, a new VPN is created and modified VRF is added to the newly created VPN (step 504). In step 505, a determination is made whether there are any other VRFs in the previous VPN. If there are no other VRFs in the previous VPN, the previous VPN is deleted (step 506). If there are other VRFs in the previous VPN, another determination is made whether the deleted VRF is a hub VRF and the VPN is a non-full mesh type (step 507). If the deleted VRF is a hub VRF and the VPN is a non-full mesh type, the existing VPN is split into different VPNs (step 508), and the method, in this embodiment, ends at step 524.

If a single VPN is found (step 509), a determination is made whether the found VPN is identical to the previous VPN (step 510). If the found VPN is identical to the previous VPN, the method, in this embodiment, ends at step 524. This means there is no change to existing VPN. However, if the found VPN is not identical to the previous VPN, VRF is removed from the previous VPN, VRF neighbours to other VRFs in the previous VPN are removed and modified VRF is added to the newly found VPN (step 511). In step 512, another determination is made whether the modified VRF is hub VRF and the previous VPN type is a non-full-mesh type. If the modified VRF is hub VRF and the previous VPN type is a non-full-mesh type, the old VPN is split into different VPNs (step 513), and the method, in this embodiment, ends at step 524. In step 514, a determination is made whether the newly found VPN type is a non-full mesh type. If the newly found VPN type is a non-full mesh type, VRF neighbours to other VRFs are created in the newly discovered VPN (step 515), and the method, in this embodiment, ends at step 524.

If more than one virtual private network (VPN) is found (step 516), all found VPNs are merged together to form a merged VPN (517). In step 518, a determination is made whether the merged VPN contains a previous VPN. If the merged VPN contains no previous VPN, VRF is removed from the previous VPN (step 519). In step 520, another determination is made whether the previous VPN is non-full mesh type. If the previous VPN is non-full mesh type, VRF neighbours to other VRFs in the previous VPN are removed (step 521). In step 522, a determination is made whether the merged VPN is a non-full-mesh type. If the merged VPN is a non-full-mesh type, neighbours to other VRFs are created in the merged VPN(step 521), and the method, in this embodiment, ends at step 524.

Figure 6:
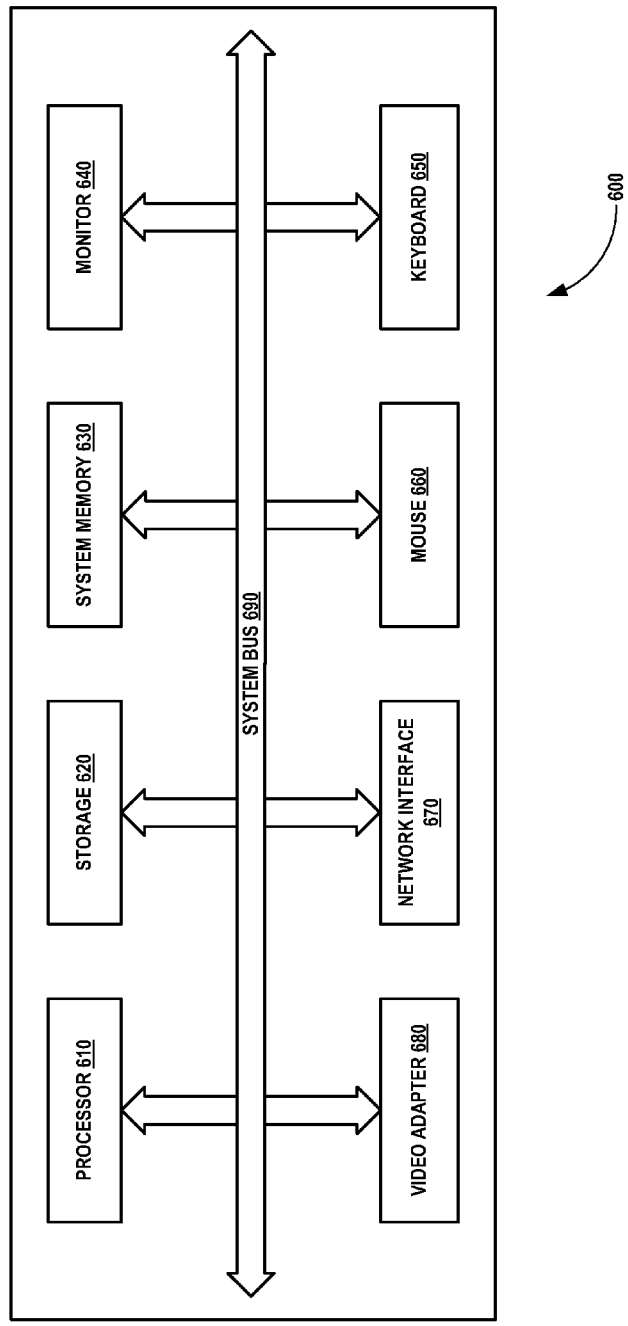
FIG. 6 shows a block diagram of a computer system upon which an embodiment may be implemented.

FIG. 6 shows a block diagram of a computer system 600 upon which an embodiment may be implemented. The computer system 600 includes a processor 610, a storage medium 620, a system memory 630, a monitor 640, a keyboard 650, a mouse 660, a network interface 670 and a video adapter 680. These components are coupled together through a system bus 690.

The storage medium 620 (such as a hard disk) stores a number of programs including an operating system, application programs and other program modules. A user may enter commands and information into the computer system 600 through input devices, such as a keyboard 650, a touch pad (not shown) and a mouse 660. The monitor 640 is used to display textual and graphical information.

An operating system runs on processor 610 and is used to coordinate and provide control of various components within personal computer system 600 in FIG. 6. Further, as mentioned earlier, a Network Management System (NMS), such as, but not limited to, NNMi SPI for MPLS 8.10 from Hewlett-Packard, may be used on the computer system 600 to manage the VPN implementation of FIG. 1 and the various embodiments described above.

It would be appreciated that the hardware components depicted in FIG. 6 are for the purpose of illustration only and the actual components may vary depending on the computing device deployed for implementation of the present invention. Further, the computer system 600 may be, for example, a desktop computer, a server computer, a laptop computer, or a wireless device such as a mobile phone, a personal digital assistant (PDA), a hand-held computer, etc.

Some of the advantages provided by the above described embodiments of determining network topology of a virtual private network in Multi Protocol Label Switching (MPLS) based Virtual Private Networks (MPLS/VPNs) may be summarized as follows:

The embodiment described provides a faster computation of network configuration changes and scales well in big networks as only the changed VPNs are re-processed. In addition, it keeps the logical topology up to date with the physical topology thus reducing the window of inconsistency between the logical and physical topology. Moreover, the incremental VPN computation helps in accurate status computation and accurate route cause analysis.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method for determining network topology of a virtual private network in Multi Protocol Label Switching (MPLS) based Virtual Private Networks (MPLS/VPNs), the method comprising:
    obtaining VPN routing and forwarding (VRF) details of at least one virtual private network in Provider Edges routers;
    determining, from said VRF details, any variation in network configuration; and
    determining, from said network configuration variation, network topology of the at least one virtual private network based on whether there is a newly created VRF, a modified VRF or a deleted VRF in the VRF details, and wherein determining the network topology of the at least one virtual private network based on the newly created VRF comprises:
        obtaining intersecting virtual private network details for the VRF from previously discovered virtual private networks; and
        merging all found virtual private networks and adding the newly created VRF to the merged virtual private network, if the newly created VRF intersecting more than one virtual private network from the previously discovered virtual private networks is found.

2. A method according to claim 1, wherein determining network topology of the at least one virtual private network based on the newly created VRF further comprises:
    creating a new virtual private network and adding the VRF to the newly created virtual private network, if no virtual private network is found; and
    adding VRF to a found virtual private network, if a single virtual private network is found.

3. A method according to claim 2, wherein adding VRF to a found virtual private network if a single virtual private network is found further comprises the step of creating VRF neighbours to other VRFs in the found virtual private network if the virtual private network is a non-full-mesh type.

4. A method according to claim 1, wherein merging all found virtual private networks and adding the VRF to the merged virtual private network if more than one virtual private network is found further comprises the step of creating VRF neighbours to other VRFs in the found virtual private network if the virtual private network is a non-full-mesh type.

5. A non-transitory computer readable storage medium having instructions, that when executed by a computer, result in execution of the method of claim 1.

6. A computer-implemented method for determining network topology of a virtual private network in Multi Protocol Label Switching (MPLS) based Virtual Private Networks (MPLS/VPNs), the method comprising:
    obtaining VPN routing and forwarding (VRF) details of at least one virtual private network in Provider Edges routers;
    determining, from said VRF details, any variation in network configuration; and
    determining, from said network configuration variation, network topology of the at least one virtual private network based on whether there is a newly created VRF, a modified VRF or a deleted VRF in the VRF details, wherein determining network topology of the at least one virtual private network based on the deleted VRF comprises:
        obtaining existing virtual private network for the deleted VRF;
        deleting VRF neighbours to other VRFs in the existing VPN if the virtual private network is non-full-mesh type;
        deleting virtual private network and VRF if there are no other VRFs in the existing virtual private network; and
        splitting the existing virtual private network if there are other VRFs in the existing virtual private network and the deleted VRF is a hub VRF and the virtual private network is a non full mesh type.

7. A non-transitory computer readable storage medium storing computer program comprising code, that when executed by a computer, result in execution of all of the steps of claim 6.

8. A computer-implemented method for determining network topology of a virtual private network in Multi Protocol Label Switching (MPLS) based Virtual Private Networks (MPLS/VPNs), the method comprising:
    obtaining VPN routing and forwarding (VRF) details of at least one virtual private network in Provider Edges routers;
    determining, from said VRF details, any variation in network configuration; and
    determining, from said network configuration variation, network topology of the at least one virtual private network based on whether there is a newly created VRF, a modified VRF or a deleted VRF in the VRF details, wherein determining network topology of the at least one virtual private network based on the modified VRF comprises:
        obtaining existing virtual private network;
        obtaining intersecting virtual private networks for the modified VRF from already discovered virtual private networks, wherein if no virtual private networks are found, the method comprises:
            deleting VRF neighbors to other VRFs in previous virtual private network;
            creating a new virtual private network;
            adding modified VRF to the newly created virtual private network;
            deleting the previous virtual private network, if there are no other VRFs in the previous virtual private network; and
            splitting the existing virtual private network, if there are other VRFs in the previous virtual private network and the deleted VRF is a hub VRF and the virtual private network is a non full mesh type.

9. A method according to claim 8, wherein if a single virtual private network is found, the method comprises:
    deleting VRF from the existing virtual private network, deleting VRF neighbours to other VRFs in previous virtual private network and adding the modified VRF to the found single virtual private network, if the found single virtual private network is not identical to the previous virtual private network;
    splitting the previous virtual private network, if the modified VRF is a hub VRF and the previous virtual private network is non full mesh type; and creating VRF neighbours to other VRF neighbours in the found single virtual private network, if the found single virtual private network is a non full mesh type.

10. A method according to claim 8, wherein if more than one virtual private network is found, the method comprises:
merging all found virtual private networks into a merged virtual private network;
deleting VRF from previous virtual private network, if the merged virtual private network contains no previous virtual private network;
deleting VRF neighbours to other VRFs in the previous virtual private networks, if the previous virtual private network is non full mesh type; and
modifying neighbours to other VRFs in the merged virtual private network, if the merged virtual private network is a non full mesh type.

11. A method according to claim 8, wherein if more than one virtual private network is found, the method comprises:
merging all found virtual private networks into a merged virtual private network; and
modifying neighbours to other VRFs in the merged virtual private network, if the merged virtual private network contains previous virtual private network and is a non full mesh type.

12. A non-transitory computer readable storage medium having instructions, that when executed by a computer, result in execution of the method of claim 8.

13. A system for determining network topology of a virtual private network in Multi Protocol Label Switching (MPLS) based Virtual Private Networks (MPLS/VPNs), the system comprising:
means for obtaining VPN routing and forwarding (VRF) details of at least one virtual private network;
means for determining, from said VRF details, any variation in network configuration; and
means for determining, from said network configuration variation, network topology of the at least one virtual private network based on whether there is a newly created VRF, a modified VRF or a deleted VRF from the VRF details, wherein means for determining network topology of the at least one virtual private network based on the deleted VRF comprises:
means for obtaining existing virtual private network for the deleted VRF;
means for deleting VRF neighbours to other VRFs in the existing VPN if the virtual private network is non-full-mesh type;
means for deleting virtual private network and VRF if there are no other VRFs in the existing virtual private network; and
means for splitting the existing virtual private network if there are other VRFs in the existing virtual private network and the deleted VRF is a hub VRF and the virtual private network is a non full mesh type.

14. A system for determining network topology of a virtual private network in Multi Protocol Label Switching (MPLS) based Virtual Private Networks (MPLS/VPNs), the system comprising:
means for obtaining VPN routing and forwarding (VRF) details of at least one virtual private network;
means for determining, from said VRF details, any variation in network configuration; and
means for determining, from said network configuration variation, network topology of the at least one virtual private network based on whether there is a newly created VRF, a modified VRF or a deleted VRF from the VRF details, wherein means for determining network topology of the at least one virtual private network based on the modified VRF comprises:
means for obtaining existing virtual private network;
means for obtaining intersecting virtual private networks for the modified VRF from already discovered virtual private networks, wherein if no virtual private networks are found, the system comprises:
means for deleting VRF neighbors to other VRFs in previous virtual private network;
means for creating a new virtual private network;
means for adding modified VRF to the newly created virtual private network;
means for deleting the previous virtual private network, if there are no other VRFs in the previous virtual private network; and
means for splitting the existing virtual private network, if there are other VRFs in the previous virtual private network and the deleted VRF is a hub VRF and the virtual private network is a non full mesh type.

15. A system for determining network topology of a virtual private network in Multi Protocol Label Switching (MPLS) based Virtual Private Networks (MPLS/VPNs), the system comprising:
means for obtaining VPN routing and forwarding (VRF) details of at least one virtual private network;
means for determining, from said VRF details, any variation in network configuration; and
means for determining, from said network configuration variation, network topology of the at least one virtual private network based on whether there is a newly created VRF, a modified VRF or a deleted VRF from the VRF details, and wherein means for determining the network topology of the at least one virtual private network based on the newly created VRF comprises:
means for obtaining intersecting virtual private network details for the VRF from previously discovered virtual private networks; and
means for merging all found virtual private networks and adding the newly created VRF to the merged virtual private network, if the newly created VRF intersecting more than one virtual private network from the previously discovered virtual private networks is found.

* * * * *